United States Patent [19]

Schönemann

[11] Patent Number: 4,683,628

[45] Date of Patent: Aug. 4, 1987

[54] HEATABLE CALENDER ROLLER

[75] Inventor: Joachim Schönemann, Netphen, Fed. Rep. of Germany

[73] Assignee: Walzen-Irle GmbH, Netphen, Fed. Rep. of Germany

[21] Appl. No.: 819,172

[22] Filed: Jan. 15, 1986

[30] Foreign Application Priority Data

Jan. 16, 1985 [DE] Fed. Rep. of Germany ... 8500950[U]

[51] Int. Cl.$^4$ .................. B21B 13/02; B21B 31/08
[52] U.S. Cl. ..................... 29/116 R; 29/116 AD; 29/130
[58] Field of Search ............ 29/116 R, 130, 126, 29/110, 116 AD; 100/155 R, 168; 165/89

[56] References Cited

U.S. PATENT DOCUMENTS

| 3,562,489 | 2/1971 | Lenk | 165/89 |
| 3,745,625 | 7/1973 | Jaegers et al. | 29/116 AD |
| 4,048,701 | 9/1977 | Marchioro | 29/116 AD |
| 4,327,468 | 5/1982 | Küsters et al. | 29/116 AD |
| 4,399,747 | 8/1983 | Schiel et al. | 29/116 AD |
| 4,404,724 | 9/1983 | Christ et al. | 29/116 AD |
| 4,414,890 | 11/1983 | Schiel et al. | 29/116 AD |
| 4,447,940 | 5/1984 | Appenzeller et al. | 29/116 AD |
| 4,498,527 | 2/1985 | Gerants et al. | 165/89 |

Primary Examiner—Howard N. Goldberg
Assistant Examiner—Irene Graves Golabi
Attorney, Agent, or Firm—Karl F. Ross; Herbert Dubno

[57] ABSTRACT

A calender roller includes a hollow cylindrical roller body which is traversed by a stationary shaft whose outer diameter is smaller than the inner width of the roller body so that a gap is defined therebetween. The opposing end portions of the shaft are provided with rolling bearings to support the roller body and accommodate the channel system for connecting the gap with an inlet and outlet for a thermal transmitting fluid. Provided between the lateral end faces of the gap and the bearings are sealing and fitting members which are movable in axial direction to control the length of the heating zone along the roller body.

19 Claims, 3 Drawing Figures

HEATABLE CALENDER ROLLER

FIELD OF THE INVENTION

My present invention refers to a calender roller and, more particularly, to a heatable calender roller whose inner shell cooperates with a displacement body to define a gap therebetween for a thermal transfer fluid or medium.

BACKGROUND OF THE INVENTION

Heated calender rollers are especially used in the paper industry, rubber industry or plastics industry. In view of the very small thickness of processed webs, these calender roller are manufactured within exacting tolerances so as to provide same gap thickness and line pressures along the effective surface at working load. Rollers provided with cambering meet these requirements only by maintaining predetermined parameters. The bending of the rollers can be countered by employing suitable devices applying bending moments onto the roller journals. It has been found, however, that the loading or deflection of the generatrix could not be compensated by such bending devices uniformly over the entire surface length of the roller.

Consequently, it has been proposed especially in paper and textile calenders to use so called "floating rollers" which include a stationary shaft centering via suitable bearings a hollow cylindrical roller body which receives a pressure fluid introduced into a gap defined between the shaft and the roller body.

A drawback of such floating rollers is that their shafts have a smaller support width than the remaining rollers. Especially when using heatable rollers which are equipped with displacement filling practically all of the rollers except for the clearance traversed by the fluid, problems have been encountered upon centering and fixation of conventional displacing bodies of sheet metal within the hollow cylindrical roller bodies, and moreover at high speeds or sudden decelerations to a standstill, forces are generated which could considerably deform or destroy the displacing body thus requiring expensive and difficult repair work.

During the manufacture of paper, it is required to provide identical bending lines of the converging rollers. This could be obtained by cambering or roller flextion or by use of compensating rollers. A further adaptation of the bending lines is provided through partial cooling and/or heating of the rollers to thermally alter their diameter. In this connection the use of cold air or hot air or steam nozzles and also partial induction heating has been proposed.

Especially in the production of paper, it has been shown that the achieved smoothness, gloss as well as printability can be considerably enhanced when increasing the nip pressure and/or especially the roller temperature. Thus, it appears to be advantageous to heat up the rollers considerably so that the range of the thermal compensation is limited.

Practice has, however, revealed that a considerable amount of the margin of the paper webs had to be discarded because the paper web obtained during the stock preparation in the breast box, during the wire section, pressing section and drier section not only showed calibrating errors but especially due to the drying phase produces margins of the paper web that are heated to a higher degree than the central areas which remain in a more moist stage. Although the heat transmission from the roller to the paper is reduced at the margins because of the lower heat conductivity, the margins despite the lower heat absorption, remain drier and are heated up to higher temperatures than the moist central areas as the drier margins have a lower specific heat than the moist central areas.

Consequently, the calender rollers finishing the paper webs will emit less heat at the margins of the web than at the central areas so that its thermal balance and thus its outer contour is marred. This drawback is further worsened by the mechanical heat transformation which is increased at the presence of narrow gaps and additionally increased by the usually stronger margins of the paper.

To prevent a different drying degree from arising between the margins and the central areas of the paper, it has been proposed to moisturize the margins so as to obtain a uniform dampness. To provide such a damping is rather complicated and did actually not solve the described problems.

OBJECTS OF THE INVENTION

It is thus the principal object of my present invention to provide an improved heatable calender roller obviating the afore-stated drawbacks.

Another object is to improve heated calender rollers of the character described so that they can be heated in a defined manner.

It is further an object of my invention to provide an improved calender roller which includes a stable displacement body.

It is also an object of the present invention to provide a calender roller which is compatible, with respect to support distances and distances between bearings, with standard compensating rollers, especially floating-type rollers.

It is yet another object of the present invention to provide a calender roller in which a control can be carried out of the heated surface area of the roller.

It is still another object of the invention to provide a calender roller in which the peripheral and less moist regions of a respective strand of material can be subjected to less heat in conformity with the lower moisture content.

SUMMARY OF THE INVENTION

I realize this object, in accordance with the present invention, by providing a stationary shaft traversing a hollow cylindrical roller body to define a gap therebetween for guiding a thermal transmission fluid and including roller bearings which bilaterally support the roller body and are sealed against the gap by respective sealing elements. The opposing end portions of the shaft accomodate a plurality of channels for allowing the thermal transmitting fluid to flow from an inlet connection via the gap towards an outlet connection.

Each of the end portions of the shaft is provided with a first axially extending channel and with a second radially extending channel whose one end is connected to the respective first channel and whose other end communicates with said gap.

Alternatively, the seal or fitting bodies, or the packing bodies arranged in front thereof, can be adjusted by means of screew spindles which extend into them and cooperate with respective spindle nuts.

A very easy adjustment, also during operation of the assembly, is achieved when a hydraulic chamber is provided between the seal bodies and the packing bodies, and the hydraulic chamber is equipped with inlet channels.

Re-setting of the packing bodies can be carried out by way of springs which act on the respective end faces or walls of such packing bodies, which are pretensioned, accordingly, by the springs. On the other hand, one can use the pressure of the transfer medium to re-set the packing bodies, or through the removal, by pumping action, of the respective hydraulic fluid.

It is also preferred that the seal and packing bodies surround and engage one another with respective cylindrical guide and/or sealing surfaces.

Through the provision of such a calender roller, the support widths and distances of the bearings are easily adjustable in a similar manner as known in compensating rollers. The gap between the stationary shaft and the inner shell of the roller body can be designed at such a narrow cross section that a defined guidance of the transmitting fluid is achieved thus providing a uniform heating. Despite the fact that in contrary to conventional floating rollers, the bearings have to receive the respective supporting force as no compensating pressure fluid is used, it is to be noted that the stationary shaft acts as a stable displacing body which is not subjected to forces due to acceleration.

According to a further teaching of the invention, the shaft is provided with circumferential grooves and/or axial strips (ribs) to cause turbulence in the transmitting fluid within the gap thereby increasing the heat transfer.

An important feature of the invention resides in the control of the entire length of the heating zone by providing at the lateral end faces of the gap respective sealing elements which are axially displaceable.

Each sealing element includes a fitting member which cooperates with a sealing member to define an annular chamber therebetween and is under the action of one end of a compression spring whose other end is supported by the shaft. By controlling the flow of a fluid into the chamber, the fitting member can be shifted during operation towards or away from the gap so as to restrict or enlarge the heating zone. The use of such heatable calender rollers which allow an adjustment of the heating zone is particularly advantageous for the paper industry and paper webs with uniform moisture content across their widths in achieving only a minimum waste of paper margins.

BRIEF DESCRIPTION OF THE DRAWING

The above and other features, objects and advantages of my present invention will become more readily apparent from the following description, reference being made to the accompanying highly diagrammatic drawing in which.

SPECIFIC DESCRIPTION

Figure 1:
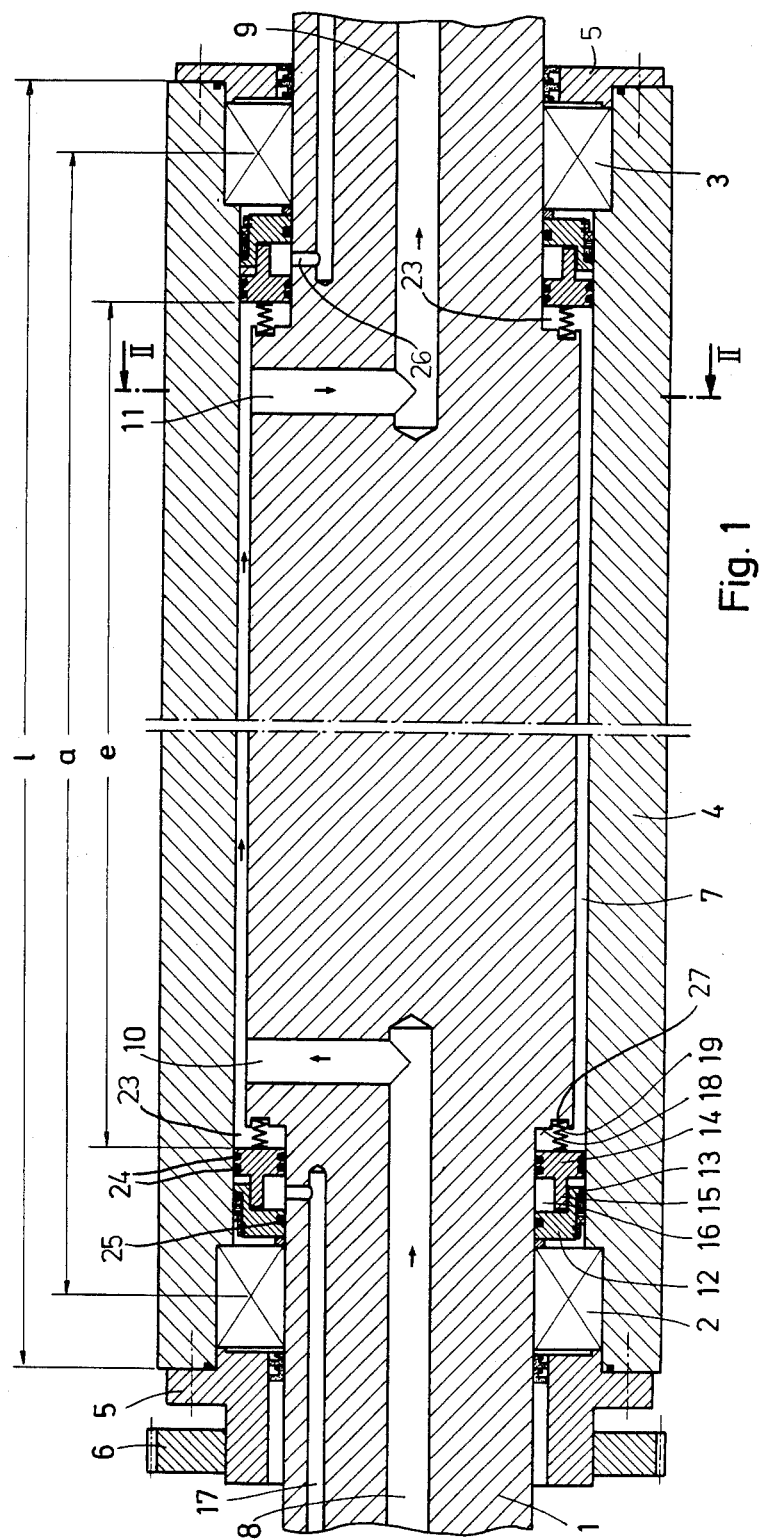
FIG. 1 is a fragmentary longitudinal section of one embodiment of a calender roller according to the invention.

In the drawing, I have shown a calender roller including a roller body 4 of hollow cylindrical shape which is traversed by a stationary displacement body designed as a shaft 1 whose extremities are tightly clamped during operation in a not shown manner. The opposing end portions of the shaft 1 are of smaller diameter than the central section thereof and are each provided with respective roller bearings 2, 3 to support the roller body 4. For tightening the outer rings of the bearings 2, 3, the roller body 4 is provided at its both extremities with a flange 5 acting as a bearing cap. As is shown in FIG. 1, the flange 5 at the left hand side in FIG. 1 cooperates with a spur wheel 6 which forms part of an otherwise not shown drive mechanism for the roller body 4.

As can be seen from FIG. 1, the roller body 4 has an inner diameter exceeding the outer diameter of the central section of the shaft so that a gap 7 is defined therebetween whose width ranges, e.g. between 8 to 16 mm. The gap 7 is filled with a thermal transmitting fluid, e.g. heated oil which is supplied via a channel 8 and a channel 10. The channel 8 extends in axial direction at a central location within the one axial end of the shaft 1 and is connected with its one end to a not shown supply line while its other end communicates with the channel 10 which extends radially within the shaft 1 and is connected to the gap 7. The other axial end of the shaft 1 accomodates in similar manner an axially extending central channel 9 whose one end is connected to a not shown discharge line and whose other end is connected to a radial channel 11 communicating with the gap 7. The fluid, thus circulating in direction of the indicated arrows, is supplied through channel 8 and is introduced via channel 10 into the gap 7 so as to completely surround and contact the inner shell of the roller body 4 and then is discharged through channel 9 via the radial channel 11.

As already mentioned, the end portions of the shaft 1 are of smaller diameter than its central portion so that respective shoulders 18 are formed defining with the shaft 1 and the roller body 4 spaces 23 of a width exceeding the width of the gap 7. Accomodated within each space 23 is a fitting member 14 which is provided with gaskets 24 sealing the fitting member 14 against the shaft 1 as well as against the inner jacket of the roller body 4. Integrally connected with the fitting member 14 is a projection 15 which extends in axial direction towards the respective bearings 2, 3 and is surrounded by a further projection 13 of an opposing sealing member 12 so that an annular chamber 16 is defined between the sealing member 12 and the fitting member 12. Each sealing member 12 accomodates further gaskets 25 for sealing the chambers 16 against the bearings 2, 3.

Each chamber 16 communicates via a radial channel 26 with a channel 17 which extends axially within the shaft 1 parallel above the respective channels 8 or 9 and is connected to a hydraulic control mechanism (not shown). As will be described hereinbelow, the dimension of each chamber 16 is variable by allowing the fitting members 14 to be displaced in axial direction within the space 23. Accordingly, each fitting member 14 is under the action of a compression spring 19 whose one end rests against the end face of the fitting member 14 while its other end is supported in a recess 27 of the shoulder 18. By controlling the flow of a pressure fluid into the chambers 16 during the operation of the calender roller, each fitting member 14 can be shifted against the force of the associated compression spring 19.

Figure 3:
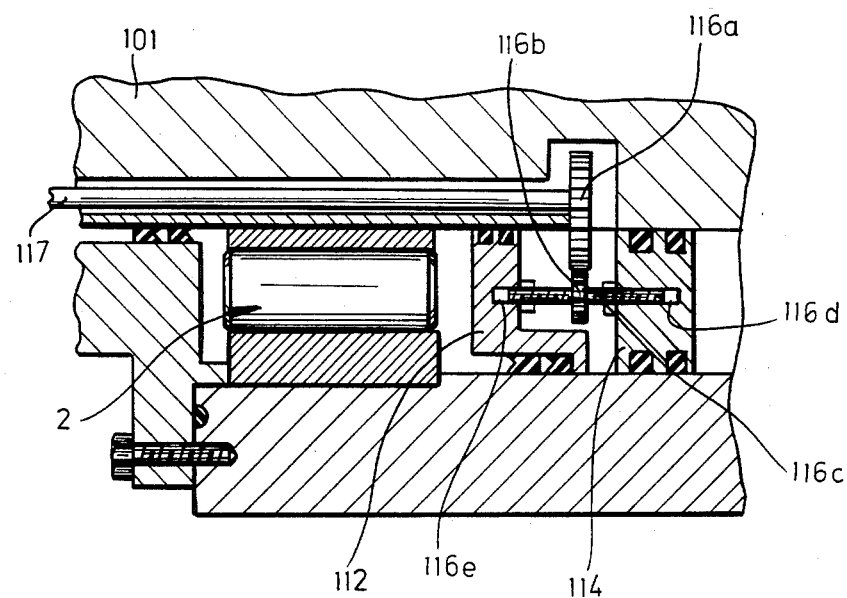
FIG. 3 is a detail of another control means for the width of the heated zone.

The axial displacement of each fitting member 14 may, however, also be provided through other suitable means e.g. via screw spindles 116c cooperating with associated spindle nuts 116d and 116e (FIG. 3). It is also possible to allow the fitting members 14 to freely move to such a degree that introduction of the pressure fluid will cause them to shift in one direction while a discharge of the fluid is sufficient to move the fitting members 14 into the other direction. In addition, it is also feasible to provide the sealing member 12 in an axially movable manner. In FIG. 3 the spindles 116c are shown to shift both the sealing member. or body 112 as well as the body or member 114. The spindles are adjusting a rod 117 extending through the shaft 101 and carrying a gear 116a meshing with gear 116b on the spindles.

By providing the axial displacement of the fitting members 14, 114 the entire heating zone as indicated by reference character e and defined by the gap 7 and the space between the shoulders 18 and the facing side of the fitting members 14 need not extend over the entire length 1 of the roller body 4 but is of variable length and reduced by the dimensions of the bearings 2, 3 on the one hand and the sealing members 12 and the fitting members 14 on the other hand (FIG. 1).

The positioning of the fitting members 14 and thus the control of the length e of the heating zone is provided by regulating the flow of the pressure fluid into the chambers 16. In case the heating zone should be reduced, additional pressure fluid is introduced into the chambers 16 so that the fitting members 14 are accordingly shifted in a direction towards the gap 7 against the load of the spring 19 thus reducing the space between the shoulders 18 and the fitting members 14. It should be noted, however, that it is certainly possible to control the annular chambers 16 independently from each other so that the length e of the heating zone is arbitrarily adjustable and does not necessarily extend symmetrically with respect to the center of the roller body 4 i.e. that e.g. the fitting member 14 may be displaced to a different degree than the fitting member 14 on the right hand side.

During the displacement of the fitting members 14 the projections 15 are accurately guided along the projections 13 of the respective sealing members 12.

Through the use of a stationary shaft 1 and by providing the rolling bearings 2, 3 within the length 1 of the roller body 4, the same conditions are obtained as upon the use of conventional compensating rollers. Thus, the same support width of the shaft 1 as well as the same length 1 of the roller body 4 are achieved. With respect to bending conditions, also the distance a as defined between the center planes of the bearings 2, 3 for the roller body 4 and for the associated compensating roller are the same. In compensating rollers, the forces for maintaining the predetermined surface pressing within the entire roller body are caused by the pressure fluid introduced between the shaft and the roller body while the roller bearings are essentially provided for guiding the roller while in a heatable calender roller, the gap is filled by a transmitting fluid which is only under small pressure so that the forces corresponding to the surface pressing can be carried away via the rolling bearings.

Figure 2:
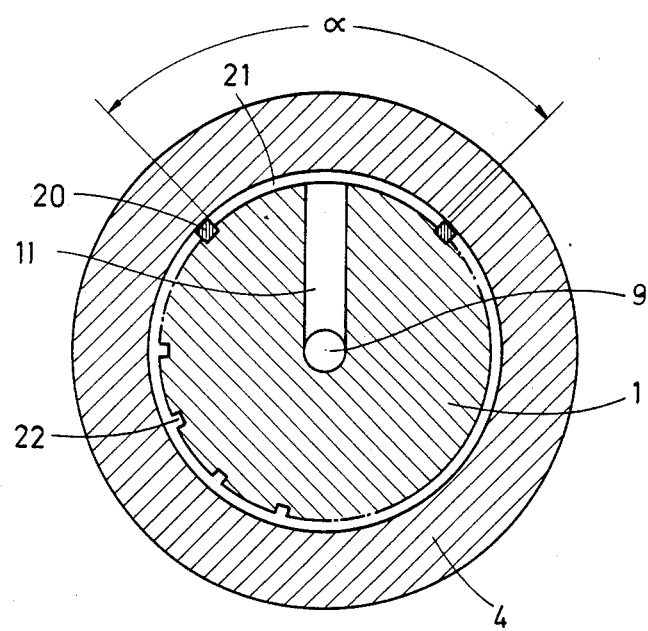
FIG. 2 is a cross sectional view of the calender roller taken along the line II—II in FIG. 1.

Turning now to FIG. 2 which illustrates a cross sectional view through the shaft 1 and the roller 4 in the area of the channel 10, it can be seen that the shaft 1 is provided at its circumference with a plurality of grooves 22 extending in axial direction. When the thermal transmitting fluid is introduced into the gap 7, turbulences are caused by the grooves 22 so that the heat transmission and thus the heat transmission coefficient is increased. In addition, the shaft 1 is provided with axially extending square strips 20 which are screwed and-/or partly recessed in the shaft 1. As is shown in FIG. 2, a pair of strips 20 are provided at a circumferential angle α and extending towards the inner jacket of the roller body 4 so that a segmental gap 21 is defined which not only increases the heat transmission but also accelerates the flow rate and thus reduces the thermal inertia. These strips 20 may also act as sealing strips which limit or prevent a leaking of transmission fluid from the segmental gap 21. Leakage losses can be collected within the remaining gap and then discharged.

The magnitude of the angle α and thus the sector as defined by the segmental gap 21 can e.g. be adapted to the paper wrap angle of the roller body. Depending on the circumstances, the angle may be selected as being equal to or exceeding the wrap angle or may be smaller than the wrap angle. Preferably, the fitting members 14 extend between the strips 20 so that the dimension of the segmental gap 21 and thus the heating zone is controllable in the described manner.

I claim:
1. A calender roller, comprising:
a hollow cylindrical roller body defining an axis;
a stationary shaft connected to an inlet and an outlet for a thermal transmitting fluid and traversing said roller body so as to define with said roller body a gap for guiding the thermal transmission fluid;
bearing means connected to said shaft for bilaterally supporting said roller body; and
sealing means for sealing said bearing means against said gap, said shaft having opposing end positions accommodating a plurality of channels for allowing the thermal transmitting fluid to flow from the inlet via said gap towards the outlet said shaft being provided with a pair of circumferential strips extending in the direction of said axis and projecting towards said roller body to define a segmental gap.

2. A calender roller as defined in claim 1 wherein each of said end portions is provided with a first channel extending in direction of said axis and with a second radially extending channel having one end connected to the respective one of said first channels and another end communicating with said gap.

3. A calender roller as defined in claim 1 wherein said shaft is provided with at least one circumferential groove to cause turbulence ofthe transmission fluid within said gap.

4. A calender roller as defined in claim 1 wherein said shaft is provided with at least one longitudinal rib extending in axial direction and partially recessed within said shaft to cause tubulence of the transmission fluid within said gap.

5. A calender roller, comprising:
a hollow cylindrical roller body defining an axis;
a stationary shaft connected to an inlet and an outlet for a thermal transmitting fluid and traversing said roller body so as to define with said roller body a gap for guiding the thermal transmission fluid;
bearing means connected to said shaft for bilaterally supporting said roller body; and
sealing means for sealing said bearing means against said gap, said shaft having opposing end positions accommodating a plurality of channels for allowing the thermal transmitting fluid to flow from the inlet via said gap towards the outlet, said shaft being provided with a pair of circumferential strips extending in direction of said axis and projecting towards said roller body to define a segmental gap, said sealing means including a sealing member arranged at each of said end portions of said shaft between said shaft and said roller body for sealing said gap against said bearing means, each of said sealing members being adjustable in axial direction, and a fitting member cooperating with each of said sealing members and adjustable in axial direction.

6. A calender roller as defined in claim 5, further comprising adjusting means for displacing said sealing members and said fitting members.

7. A calender roller as defined in claim 6 wherein said adjusting means includes a screw spindle and a spindle nut engaged by said screw spindle.

8. A calender roller as defined in claim 6 wherein each of said fitting members and each of said sealing members are provided with a cylindrical projection, said projection of said sealing members surrounding said projection of said fitting members to provide a guidance of the latter during its displacement in axial direction.

9. A calender roller as defined in claim 7 wherein said fitting members define with said sealing members respective annular chambers, and further comprising control means for regulating the flow of a hydraulic fluid into said annular chambers.

10. A calender roller as defined in claim 6 wherein said adjusting means includes a compression spring acting against each fitting member and supported by said shaft.

11. A calender roller defined in claim 10 wherein each of said annular chambers is individually connected to said control means.

12. A calender roller, comprising:
a hollow cylindrical roller adapted to be driven;
a stationary axle having a first journal end and a second journal end remote from said first journal end; said stationary axle being adapted to be connected with its one journal end to an inlet conduit for heat transfer medium and adapted to be connected with its other journal end to an outlet conduit for heat transfer medium, said axle being arranged in said cylindrical roller, and said axle leaving between its outer circumferential wall surface and the inner circumferential surface wall of said cylindrical roller a gap which can be filled with a transfer medium from said inlet conduit and which can be depleted through said outlet conduit;
bearings for supporting said cylindrical roller at each journal end at a respective end of said gap;
respective seal means positioned alongside each of said bearings and including at least one seal body adapted to be shifted in axial direction with reference to said gap; and
at least one filling body for each bearing located between a respective bearing and the adjacent terminus of said gap, and axially movable and adjustable with reference to said gap.

13. The calender roller defined in claim 12 wherein at least one seal body and at least one filling body engage one another with cylindrical guide and/or sealing surfaces.

14. The calender roller defined in claim 12 wherein an annular gap is formed between at least one seal body and at least one filling body, said annular gap being adapted to be connected to a hydraulic control system for adjusting the position of a respective filling body.

15. The calender roller defined in claim 12 wherein at least one filling body is controlled independently of at least one other packing body.

16. The calender roller defined in claim 12, further comprising means for axially displacing at least one of said seal bodies and/or said filling bodies.

17. The calender roller defined in claim 16 wherein said means for axially displacing includes at least one screw-spindle cooperatingly moving within a respective spindle nut.

18. A heatable calender roller, comprising:
a hollow cylindrical roller adapted to be driven;
stationary axle having a first journal end and a second journal end remote from said first journal end; the journals of said stationary axle having feeding channels (bores 2), one of them being adapted to be connected with an inlet conduit for heat transfer medium and the other being adapted to be connected with an outlet conduit for heat transfer medium, said axle being arranged in said cylindical roller, and said axle leaving between its outer circumferential wall surface and the inner circumferential surface wall of said cylindrical roller a gap which can be filled with a transfer medium from said inlet conduit and which can be depleted through said outlet conduit;
bearings for supporting said cylindrical roller at each journal end at a respective end of said gap; and
respective seal means positioned alongside each of said bearings and includng at least one seal body adapted to be shifted in axial direction with reference to said gap.

19. A heatable calender roller, comprising:
a hollow cylindrical roller adapted to be driven;
a stationary axle having a first journal end and a second journal end remote from said first journal end; the journals of said stationary axle having feeding channels (bores 2), one of them being adapted to be connected with an inlet conduit for heat transfer medium and the other being adapted to be connected with an outlet conduit for heat transfer medium, said axle being arranged in said cylindrical roller, and said axle leaving between its outer circumferential wall surface and the inner circumferential surface wall of said cylindrical roller a gap which can be filled with a transfer medium from said inlet conduit and which can be depleted through said outlet conduit;
bearings for supporting said cylindrical roller at each journal end at a respective end of said gap;
respective seal means positioned alongside each of said besarings and including at least one seal body; and
at least one filling body for each bearing located between a respective bearing and the adjacent terminus of said gap, and axially movable and adjustable with reference to said gap.

* * * * *